C. E. TOWNLEY.
FENCE GATE.
APPLICATION FILED MAR. 22, 1910.
989,082.
Patented Apr. 11, 1911.
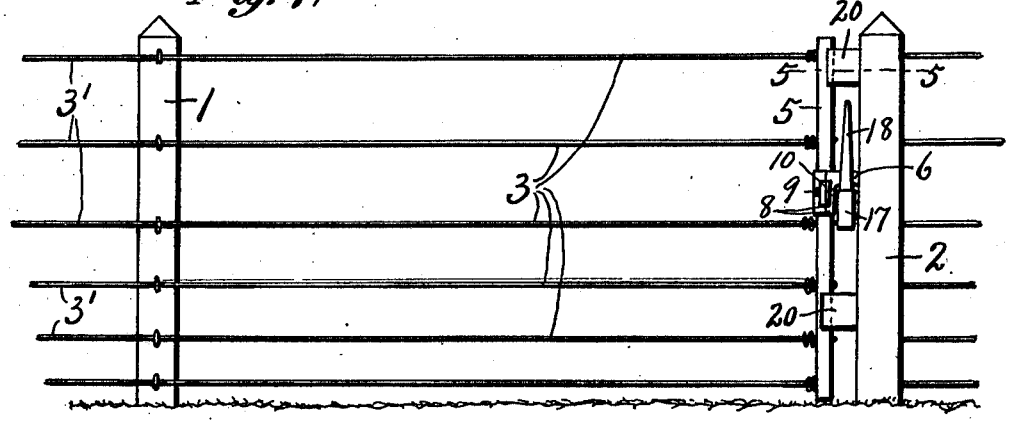
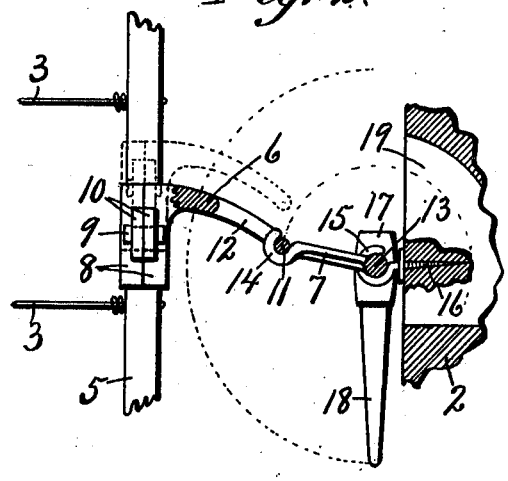
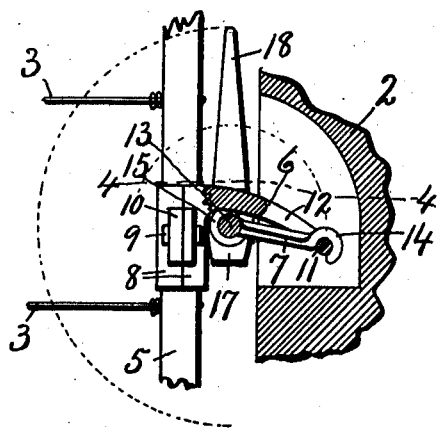
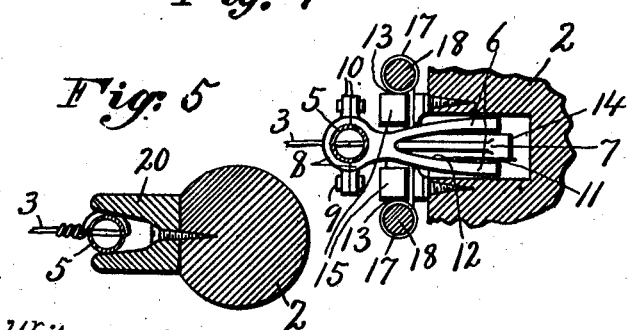
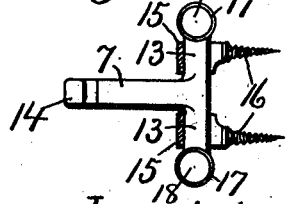
Witnesses
E. J. Stout
H. E. Chase
Inventor
C. E. Townley
By Howard P. Denison
Attorney.

UNITED STATES PATENT OFFICE.

CHARLES E. TOWNLEY, OF DRYDEN, NEW YORK.

FENCE-GATE.

989,082.  Specification of Letters Patent.  Patented Apr. 11, 1911.

Application filed March 22, 1910. Serial No. 550,932.

*To all whom it may concern:*

Be it known that I, CHARLES E. TOWNLEY, of Dryden, in the county of Tompkins, in the State of New York, have invented new and useful Improvements in Fence-Gates, of which the following, taken in connection with the accompanying drawings, is a full, clear, and exact description.

This invention relates to certain improvements in fence gates and refers more particularly to that class of gates made from wire, woven-wire or other materials that have to be brought to a tension to be effective.

The main object is to provide a simple means whereby the gate may be locked and released in and from its operative position and the wires of the gate tightened or relaxed as the gate is locked or unlocked.

Other objects and uses relating more particularly to the tightening and locking devices will be brought out in the following description.

In the drawings: Figure 1 is an elevation of my improved gate shown as constituting a part of a wire fence. Fig. 2 is an enlarged detailed sectional view partly in elevation of the locking and tightening device shown in its released position for relaxing the wires of the gate. Fig. 3 is a similar sectional view partly in elevation of the same mechanism shown in its locked position. Figs. 4 and 5 are horizontal sectional views taken respectively on lines 4—4, Fig. 3 and 5—5, Fig. 1. Fig. 6 is a top plan of the rotary locking member showing its bearings partly in section.

The gate proper which forms the subject matter of the present invention is supported between suitable supports as gate posts —1— and —2— spaced a desired distance apart according to the use for which it is intended. This gate comprises a series of substantially horizontal flexible members as wires —3— located one above the other which are properly fastened to one of the supports, as —1—, and extended across and to the opposite side of the gate opening where they are suitably fastened or anchored to an upright gate-stile or bar —5—. The wires —3— are more or less flexible or bendable and therefore constitute a flexible connection between the gate and post or support —1— to permit the gate as an entirety including the bar —5—, to be swung laterally to its full open or closed position or to any angle.

When the gate is closed as shown in Fig. 1, the stile or upright bar —5— is in close proximity and substantially parallel with the adjacent gate post —2— where it is held in position by a suitable locking mechanism presently described. This locking mechanism preferably comprises two locking members —6— and —7— one of which as the locking member —6— consists of a laterally projecting arm having a hub —8— adjustably secured to the upright stile —5— by bolts —9—, which in this instance are passed through apertured ears —10— on opposite sides of the hub —8—. The locking member or arm —6— projects from the stile —5— toward the post —2— and terminates in a suitable hinge pin or bearing —11—, the intermediate portion of the arm —6— just back of the bearing pin —11— being slotted at —12— for the reception of the free end of the locking member —7—. This locking member —7— also consists of a laterally projecting arm having opposite journals —13— projecting laterally from opposite sides of one end thereof, the opposite or free end of the arm —7— terminating in a hook or bearing —14— which is open preferably at the top when in position, shown in Fig. 2.

The journals —13— of the arm —7— are seated in suitable bearings —15— formed on the ends of screws —16— which are screwed into the adjacent side of the post —2—, so as to support the arm —7— in proper position relative to locking member —6—. The outer ends of the journals —13— are provided with parallel sockets or ferrules —17— for receiving suitable handles —18— whereby the locking member —7— may be rocked in the bearings —15— through part of the arc of a circle, as shown in Figs. 2 and 3.

In opening the gate, the locking member —7— is rocked to the position shown in Fig. 2, so as to project laterally away from the post —2— with the open side of its hook-shaped bearing —14— at the top, so that the adjacent end of the gate may be lifted to disengage or unset the hinge pin —11— from the bearing —14— and thereby permit the gate to be swung laterally in either direction to its open or partly open position, as may be desired.

In locking the gate, the free end thereof is lifted into position to engage the pin —11— in the seat or bearing —14— in the locking member —7—, whereupon the locking member —7— may be rotated upwardly and inwardly toward the post —2— and into a recess —19— therein to the position shown in Fig. 3 by means of either of the handles —18—, thereby drawing the stile —5— toward the post —2— and simultaneously straining or tightening the wires —3—, the slot —12— permitting the pin —11— and hook —14— to be carried to a plane slightly below the horizontal plane of the swinging axis of the arm —7— so as to automatically hold the gate in its locked position. It will be observed that the pull or strain upon the wires when tightened is in horizontal lines and when the locking members are in their locked position, as shown in Fig. 3, with the locking pin —11— and hook —14— in a plane below the horizontal plane of the swinging axis of the arm —7— the arm —6— is forced against the upper side of the base of the arm —7— and prevents further downward movement of the locking members, thereby holding the gate in a substantially horizontal position while the handles assume an upright upwardly projecting position. In releasing the gate from its locked position, the handles —8— which may be operated from either the inside or outside of the fence are rocked downwardly in the direction indicated by the dotted lines, Fig. 3, thereby rocking the locking member —7— until the locking members and stile are brought to the position shown in Fig. 2, thereby permitting the gate to be released in the manner previously described.

When the gate is drawn to its closed position, as shown in Fig. 1, each end of the stile is additionally locked in place against lateral movement by seating them in grooved blocks —20— which are secured to the adjacent sides of each end of the post or support —2—, the grooved blocks or retaining members for the stile being shown more clearly in Fig. 5.

What I claim is:

A fence gate comprising vertically-disposed supports 1, 2 arranged at opposite sides of the gate opening, flexible gate members secured at one end to the support 1 and extending across the gate opening, a vertically-disposed bar connecting the opposite ends of the flexible gate members together, a downwardly curved locking member for its inner end secured to the bar and projecting toward the support 2 and having its outer end provided with an eye, bearings secured to the support 2 and arranged in a plane below the inner end of said locking member, a locking arm having its inner end provided with journals mounted in said bearings and its outer end formed with a hook engaging with said eye, and a handle connected to each of said journals for rocking the locking arm in one direction thereby swinging the locking member over the locking arm and closing the gate.

In witness whereof I have hereunto set my hand on this 17th day of March, 1910.

CHARLES E. TOWNLEY.

Witnesses:
JAMES B. FULKERSON,
GEO. E. GOODRICH.